(12) United States Patent
Schremmer et al.

(10) Patent No.: US 8,658,563 B2
(45) Date of Patent: Feb. 25, 2014

(54) METHOD AND APPARATUS FOR SORBENT PRODUCTION, PRIMARILY FOR REMOVING ARSENIC FROM DRINKING WATER

(75) Inventors: Istvan Schremmer, Budapest (HU); Jozsef Kis-Benedek, Budapest (HU); Laszlo Ebert, Budaors (HU)

(73) Assignee: HM Elektronikai, Logisztikai es Vagyonkezelo Zartkoruen Mukodo Reszvenytarsasag, Budapest (HU)

( * ) Notice: Subject to any disclaimer, the term of this patent is extended or adjusted under 35 U.S.C. 154(b) by 499 days.

(21) Appl. No.: 12/937,990

(22) PCT Filed: Apr. 14, 2009

(86) PCT No.: PCT/HU2009/000033
§ 371 (c)(1),
(2), (4) Date: Jan. 7, 2011

(87) PCT Pub. No.: WO2009/127887
PCT Pub. Date: Oct. 22, 2009

(65) Prior Publication Data
US 2011/0136663 A1    Jun. 9, 2011

(30) Foreign Application Priority Data

Apr. 15, 2008  (HU) ................................ 0800248

(51) Int. Cl.
*C01B 31/08* (2006.01)
(52) U.S. Cl.
USPC .......................................... 502/417; 422/649
(58) Field of Classification Search
USPC .......................................... 502/417; 422/649
See application file for complete search history.

(56) References Cited

U.S. PATENT DOCUMENTS

2004/0089608 A1    5/2004  Vo

FOREIGN PATENT DOCUMENTS

| SU | 1766495 A1 | 10/1992 |
| WO | WO-9948811 A1 | 9/1999 |
| WO | WO-0064578 A1 | 11/2000 |
| WO | WO-02069351 A1 | 9/2002 |

OTHER PUBLICATIONS

Zhang et al., "A method for preparing ferric activated carbon composites adsorbents to remove arsenic from drinking water". Journal of Hazardour Materials, Elsevier, vol. 148, No. 3, Aug. 30, 2007, pp. 671-678.
Database WIP Week 199341, Thomson Scientific, London, GB; AN 1993-326792.
PCT International Search Report dated Feb. 15, 2010.

*Primary Examiner* — Stuart Hendrickson
(74) *Attorney, Agent, or Firm* — Birch, Stewart, Kolasch & Birch, LLP

(57) ABSTRACT

The object of the invention is method and apparatus for sorbent production. The method comprises the steps of saturating a moisture-absorbent, wettable organic support material with the aqueous solution of a water-soluble ferric salt, then filtering it and drying it to constant weight; saturating the support material with a stoichiometric quantity (computed relative to the iron content of the support material) of oxalic acid and/or water-soluble salt of oxalic acid, then filtering it and drying it to constant weight, while converting the iron ions to insoluble ferric oxalate; converting the saturated support material to activated carbon by anaerobic heating, then subjecting said saturated support material to anaerobic cooling, while the ferric oxalate is decomposed into iron and carbon dioxide; preoxidizing iron particles of the activated carbon by a water-soluble peroxide compound, filtering the activated carbon, and rinsing it to completely remove salt therefrom, then filtering it again and drying it; converting the iron hydroxide formed on the surface of the iron particles into magnetite by anaerobic heating of the activated carbon, and subsequently cooling in an anaerobic manner the thus produced sorbent to room temperature.

23 Claims, 1 Drawing Sheet

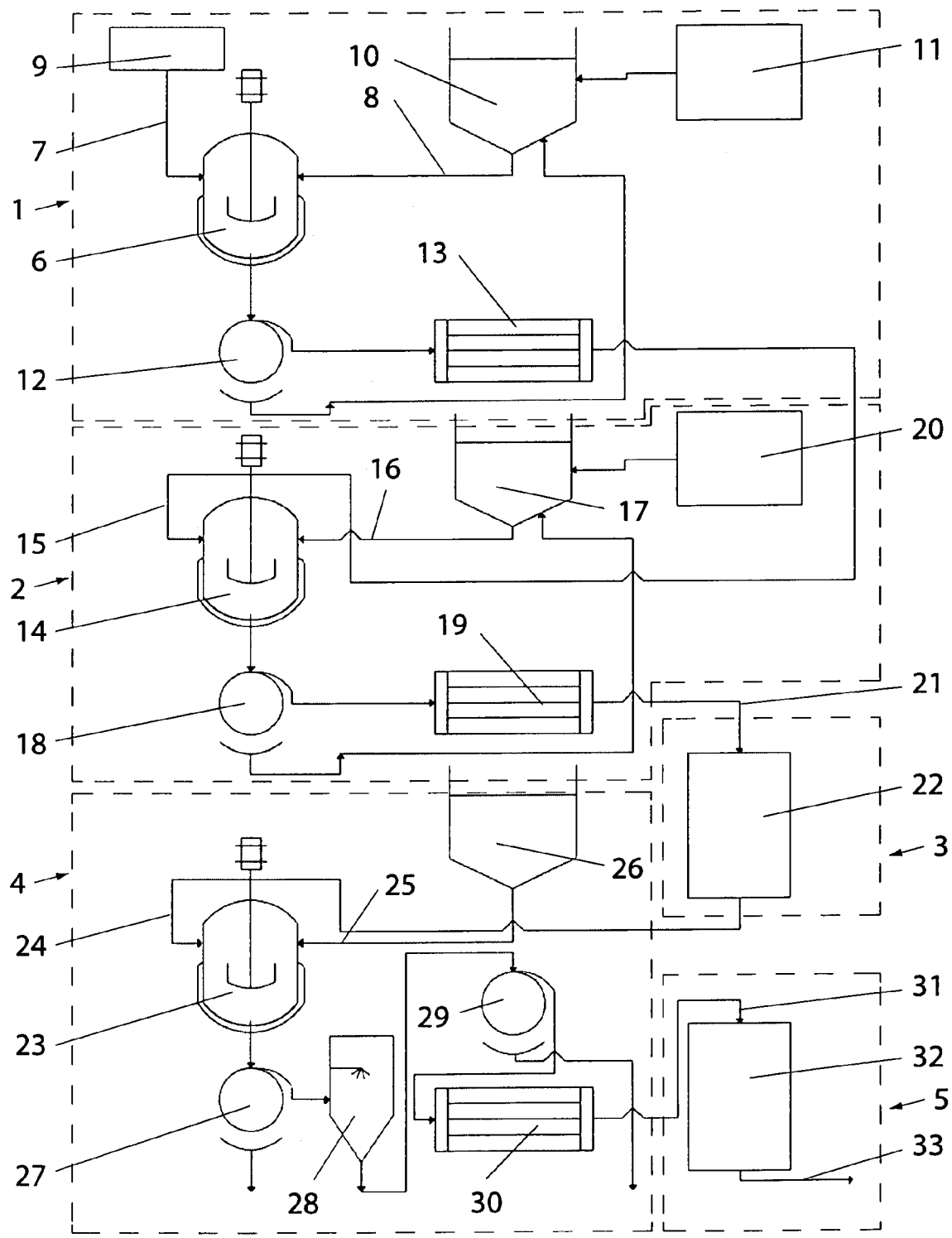

METHOD AND APPARATUS FOR SORBENT PRODUCTION, PRIMARILY FOR REMOVING ARSENIC FROM DRINKING WATER

This Application is the National Phase Under 35 U.S.C. §371 of PCT International Application No. PCT/HU2009/000033 which has an International filing date of Apr. 14, 2009, which claims priority to Hungarian Patent Application No. P0800248 filed on Apr. 15, 2008. The entire contents of all applications listed above are hereby incorporated by reference.

The invention relates to a method for sorbent production, primarily for removing arsenic from drinking water.

The availability of drinking water resources has become a significant issue in recent years. This is due to the exponential growth of global population and the shrinking of potable water supply caused on the on hand by increasing industrial and agricultural water use and on the other hand by the contamination of drinking water reserves. Decontamination of existing drinking water resources is therefore necessary for providing healthy water to a growing number of communities.

Of all contaminants present in drinking water, arsenic is among those that are the most dangerous to human health. Although the arsenic content of natural water reserves may increase due to natural processes, industrial and agricultural activities are a major factor behind rising arsenic levels. When ingested by humans, arsenic may cause severe poisoning even in low concentration, and may also induce a number of diseases such as skin cancer. The allowed level of arsenic in drinking water is thus decreasing year by year. Compared to the earlier values of 50 μ/l and 30 μ/l the present European Union guidelines (Directive 98/83/EC 1998) and United States EPA directives (US EPA 2002b) draw the line at 10 μ/l for arsenic concentration allowed in drinking water. Because many drinking water sources do not satisfy these requirements, arsenic removal methods are becoming more and more important.

Arsenic appears in drinking water in three forms: as As (III)=arsenite, As (V)=arsenate, and as bonded to different organic compounds. As (V) occurs more frequently in near-surface water, while As (III) is mainly found in subsurface water reserves. Inorganic arsenic compounds are generally more toxic than organic variants, arsenite is more toxic than arsenate, and As (III) is much more difficult to remove from water than As (V).

A number of methods have been proposed for removing arsenic from water. One of these methods is reverse osmosis, discussed for instance in the U.S. Pat. No. 6,491,822. According to the method, high pressure water is passed through a membrane. On one side of the membrane the salt content of the water increases, while on the other side water becomes free from salts and ions. This method is suitable for removing all contaminants from water but has the disadvantage of being costly. Also, salts should be reintroduced in the treated water after decontamination.

Another known method applies filtering technology. According to this method arsenic is precipitated applying filter aid (ferric and aluminium salts) and then precipitates are filtered out from the water. The disadvantages of the method are that precipitation criteria are extremely strict and should always be kept to, otherwise the desired decontamination effectiveness cannot be achieved, and that the method is not capable of removing organic arsenic compounds.

A cheap and effective class of arsenic removal methods is sorption methods. The common essential feature of these methods is that substances to be removed, such as arsenic, are selectively bonded to high-surface substances (sorbents). Commonly applied sorbents may be divided into two groups: sorbents containing iron oxide-hydroxide, and activated aluminium. U.S. Pat. No. 6,200,482 describes sorbents containing ferric hydroxide.

Nano-size sorbents containing ferric hydroxide are capable of bonding arsenic. These sorbents are produced by adding ferric hydroxide to a high-surface support material, such as activated carbon. Activated carbon is first saturated with ferric salts, then ferric hydroxide is chemically precipitated at the activated carbon surface, and then ferric hydroxide is crystallized into a suitable crystal form by heating. The method has the disadvantage that iron oxide-hydroxide particles located at the surface of the support material can be washed off easily, carrying arsenic with themselves.

The objective of our invention is to provide an iron containing sorbent in which the iron oxide-hydroxide particles carrying the arsenic contaminants cannot be separated from the activated carbon support material and therefore cannot recontaminate water. Thereby the arsenic content of water may be decreased in a much more efficient way than with the application of conventional methods. A further objective of the invention is that the sorbent may be produced in a cheap and economical way. A still further objective of the invention is to provide that the sorbent can also bond organic arsenic compounds in addition to inorganic arsenic contaminants.

The invention is based on the recognition that in case activated carbon and the high surface-activity nano-size ferric oxide (magnetite, $Fe_3O_4$) contained by it are produced at the same time, a high-surface sorbent may be produced, from which the bonded arsenic contaminant cannot be washed off.

The object of the invention is therefore a method for sorbent production, primarily for removing arsenic from drinking water, comprising the steps of saturating a moisture-absorbent, wettable organic support material with the aqueous solution of a water-soluble ferric salt, then filtering it and drying it to constant weight, saturating the support material with a stoichiometric quantity (computed relative to the iron content of the support material) of oxalic acid and/or water-soluble salt of oxalic acid, then filtering it and drying it to constant weight, while converting the iron ions to insoluble ferric oxalate, converting the saturated support material to activated carbon by anaerobic heating, then subjecting said saturated support material to anaerobic cooling, while the ferric oxalate is decomposed into iron and carbon dioxide, preoxidizing iron particles of the activated carbon by a water-soluble peroxide compound, filtering the activated carbon, and rinsing it to completely remove salt therefrom, then filtering it again and drying it, converting the iron hydroxide formed on the surface of the iron particles into magnetite by anaerobic heating of the activated carbon, and subsequently cooling in an anaerobic manner the thus produced sorbent to room temperature.

Organic substances suitable for carbonizing should be applied as support material. According to a preferred step of carrying out the method wheat bran is utilized as support material. Wheat bran is readily available and easy to process, as well as being cheap to obtain in great quantities.

According to a further preferred step of the inventive method Mohr's salt is applied as water-soluble ferric salt. Alternatively, other water-soluble Fe(II) salts, such as Fe(II) sulphate, or Fe(II) chloride may also be applied.

The concentration of the ferric salt solution should be between 50-400 g/l, preferably between 250-350 g/l. According to a further preferred step of the method, drying to constant weight is carried out at a temperature in the range of 40-100° C., preferably at 70-90° C.

In a still further preferred step of the method sodium oxalate, potassium oxalate, or ammonium oxalate is applied as water soluble salt of oxalic acid. The concentration of oxalic acid is set to 25-300 g/l, preferably to 80-120 g/l.

According to a still further preferred step carbonizing is carried out in a furnace having a temperature of 350-800° C., preferably 400-500° C. The terminal temperature of the furnace is achieved by raising the temperature at a rate of 0.1-0.6° C./s, said terminal temperature being sustained for at least one hour.

According to a further preferred step hydrogen peroxide is applied as water-soluble peroxide compound. The water-soluble peroxide compound may be sodium peroxysulphate or ammonium peroxysulphate. According to a preferred step of performing the inventive method the concentration of the peroxide compound is 5-50%, preferably 7-15%. The conversion of iron hydroxide to magnetite is carried out in an anaerobic manner in 1-6 hours, preferably in 2-4 hours, in a furnace having a temperature of 200-900° C., preferably 400-800° C.

A further object of the invention is an apparatus for sorbent production, primarily for removing arsenic from drinking water. The apparatus comprises a first saturation unit, a second saturation unit, a carbonization unit, a preoxidation unit, and a conversion unit, said units being interconnected for the transfer of materials therebetween, where the first saturation unit has a first autoclave comprising a first support material inlet and a first solution inlet, with the first autoclave being connected to a first dryer via a first filter, the second saturation unit has a second autoclave comprising a second support material inlet and a second solution inlet, with the second autoclave being connected to a second dryer via a second filter, the carbonization unit has a first furnace comprising a third support material inlet, the preoxidation unit has a third autoclave comprising a first activated carbon inlet and a third solution inlet, with the third autoclave being connected to a rinser via a third filter, and the rinser being connected to a third dryer via a fourth filter, the conversion unit has a second furnace comprising a second activated carbon inlet, with a sorbent outlet being connected to the second furnace, and where the first dryer of the first saturation unit is connected to the second autoclave of the second saturation unit through a second support material inlet, the second dryer of the second saturation unit is connected to the first furnace of the carbonization unit through a third support material inlet, the first furnace of the carbonization unit is connected to the third autoclave of the preoxidation unit through a first activated carbon inlet and the third dryer of the preoxidation unit is connected to the second furnace of the conversion unit through a second activated carbon inlet.

According to a preferred embodiment of the inventive apparatus a support material container is connected to the first autoclave through the first support material inlet, with a first solution tank being connected to the first autoclave through said first solution inlet. A ferric salt container is connected to the first solution tank. According to a further preferred embodiment of the invention the ferric salt solution separated by the first filter is recycled into the first solution tank.

An oxalic acid tank is connected to the second solution tank. The oxalic acid solution separated by the second filter is recycled into the second solution tank.

The invention will be described in detail with reference to the accompanying drawing, where FIG. 1 shows the schematic diagram of the apparatus.

In the first saturation unit 1 the support material container 9 is connected to the first autoclave 6 through a first support material inlet 7. Like all other components of the apparatus, the first autoclave 6 is a commercially available conventional device. The first autoclave 6 is connected also to a first solution tank 10 through a first solution inlet 8. The ferric salt container 11 adapted for storing the water-soluble Fe(II) salt is connected to the first solution tank 10. The saturated support material is fed from the first autoclave 6 to the first filter 12 and therefrom to the first dryer 13. The filtered Fe(II) salt solution is recycled from the first filter 12 to the first solution tank 10.

In the second saturation unit 2 the support material saturated with the ferric salt solution is fed to the second autoclave 14 through a second support material inlet 15. The second support material inlet 15 is connected to the first dryer 13. The second autoclave 14 is connected to the second solution tank 17 through the second solution inlet 16. The oxalic acid tank 20 is connected to the second solution tank 17 adapted for containing oxalic acid solution. The saturated support material is fed from the second autoclave 14 to the second filter 18 and therefrom to the second dryer 19. The filtered oxalic acid solution is recycled from the second filter 18 to the second solution tank 17.

The first furnace 22 of the carbonization unit 3 is connected to the second dryer 19 through a third support material inlet 21, while said first furnace 22 is connected to the third autoclave 23 of the preoxidation unit 4 through a first activated carbon inlet 24.

The third autoclave 23 of the preoxidation unit 4 is connected to the third solution tank 26 through a third solution inlet 25. The third solution tank 26 is adapted for containing the water-soluble peroxide compound. The activated carbon is fed from the third autoclave 23 to a third filter 27 and therefrom to a rinser 28. The rinser 28 is connected to a fourth filter 29 that is connected to a third dryer 30.

The second furnace 32 of the conversion unit 5 is connected to the third dryer 30 through a second activated carbon inlet 31. The completed sorbent is fed out from the second furnace 32 through a sorbent outlet 33.

EXAMPLE

In accordance with the above described features of the invention the support material utilized for sorbent production was wheat bran that was stored in the support material container 9. 100 kg of wheat bran was fed to the first autoclave 6 from the support material container 9. From the first solution tank 10 150 liters of Mohr's salt (Fe(II) ammonium sulphate) solution was introduced into the first autoclave 6. The concentration of the Mohr's salt solution was 300 g/l. The temperature of the first autoclave 6 was set to 80° C., and the support material was stirred and soaked until constant weight was achieved. Wheat bran saturated with Mohr's salt was then filtered utilizing the first filter 12. The Mohr's salt solution filtered by the first filter 12 was recycled into the first solution tank 10 where the concentration of the solution was reset to the initial value with the application of solid Mohr's salt contained in the ferric salt container 11. Wheat bran saturated with Mohr's salt was then fed from the first filter 12 to the first dryer 13, where it was subjected to drying to constant weight at a temperature of 80° C.

After drying wheat bran saturated with Mohr's salt was introduced into the second autoclave 14 through the second support material inlet 15. In the second autoclave 14 the wheat bran was soaked in oxalic acid of a stoichiometric quantity (computed relative to the iron content of the wheat bran) fed therein from the second solution tank 17, where the oxalic acid had a concentration of 100 g/l. Soaking was continued with continuous stirring at room temperature until constant weight was achieved. The wheat bran saturated with Mohr's salt and oxalic acid was then fed to and filtered by the second filter 18. The oxalic acid solution filtered by the second filter 18 was recycled into the second solution tank 17 where the concentration of the solution was reset to its initial value with the application of oxalic acid introduced therein from the oxalic acid tank 20. The filtered wheat bran, saturated with Mohr's salt and oxalic acid, was then dried to constant weight in the second dryer 19.

After drying, the wheat bran, saturated with Mohr's salt and oxalic acid, was introduced through the third support material inlet 21 into the first furnace 22, where it was heated to 450° C. in an anaerobic manner. The heating rate was chosen to be 0.3° C./s. After reaching its maximum value, the temperature of the furnace was kept constant for an hour.

The wheat bran (saturated with Mohr's salt and oxalic acid) thus converted to activated carbon was then subjected to anaerobic cooling to room temperature, and was fed through the first activated carbon inlet 24 into the third autoclave 23. 150 l of hydrogen peroxide solution (having a concentration of 10%) was then slowly introduced through the third solution inlet 25 into the third autoclave 23, while continuously applying stirring and cooling such that the temperature of the stock did not exceed 30-35° C. Stirring was carried on for an additional 1.5 hours after the hydrogen peroxide solution has been added. Reaction completion was indicated by the finishing of gas generation. The wheat bran treated in the above specified manner was filtered by the third filter 27 and was rinsed utilizing ion-free water to completely remove salt therefrom. The substance was then filtered applying the fourth filter 29 and dried utilizing the third dryer 30.

Subsequently, the substance was introduced through the second activated carbon inlet 31 into the second furnace 32, where the activated carbon treated in the above specified way was kept at a temperature of 600° C. for 3 hours in an anaerobic manner and was then cooled.

The sorbent thus cooled to room temperature was then fed out of the apparatus through sorbent outlet 33.

| List of reference numerals | |
|---|---|
| 1 | first saturation unit |
| 2 | second saturation unit |
| 3 | carbonization unit |
| 4 | preoxidation unit |
| 5 | conversion unit |
| 6 | first autoclave |
| 7 | first support material inlet |
| 8 | first solution inlet |
| 9 | support material container |
| 10 | first solution tank |
| 11 | ferric salt container |
| 12 | first filter |
| 13 | first dryer |
| 14 | second autoclave |
| 15 | second support material inlet |
| 16 | second solution inlet |
| 17 | second solution tank |
| 18 | second filter |
| 19 | second dryer |
| 20 | oxalic acid tank |
| 21 | third support material inlet |
| 22 | first furnace |
| 23 | third autoclave |
| 24 | first activated carbon inlet |
| 25 | third solution inlet |
| 26 | third solution tank |
| 27 | third filter |
| 28 | rinser |
| 29 | fourth filter |
| 30 | third dryer |
| 31 | second activated carbon inlet |
| 32 | second furnace |
| 33 | sorbent outlet |

The invention claimed is:

1. A method for sorbent production, primarily for removing arsenic from drinking water, comprising the steps of
saturating a moisture-absorbent, wettable organic support material with the aqueous solution of a water-soluble ferric salt, then filtering it and drying it to constant weight,
saturating the support material with a stoichiometric quantity (computed relative to the iron content of the support material) of oxalic acid and/or water-soluble salt of oxalic acid, then filtering it and drying it to constant weight, while converting the iron ions to insoluble ferric oxalate,
converting the saturated support material to activated carbon by anaerobic heating, then subjecting said saturated support material to anaerobic cooling, while the ferric oxalate is decomposed into iron and carbon dioxide, preoxidizing iron particles of the activated carbon by a water-soluble peroxide compound, filtering the activated carbon, and rinsing it to completely remove salt therefrom, then filtering it again and drying it, and
converting the iron hydroxide formed on the surface of the iron particles into magnetite by anaerobic heating of the activated carbon, and subsequently cooling in an anaerobic manner the thus produced sorbent to room temperature.

2. The method according to claim 1, wherein wheat bran is applied as organic support material.

3. The method according to claim 1, wherein Mohr's salt is applied as water-soluble ferric salt.

4. The method according to claim 1, wherein a Fe(II) salt is applied as water soluble ferrous salt.

5. The method according to claim 4, wherein the concentration of the ferric salt solution is between 50-400 g/l.

6. The method according to claim 5, wherein said concentration is between 250-350 g/l.

7. The method according to claim 4, wherein said Fe(II) salt is Fe(II) sulphate or Fe(II) chloride.

8. The method according to claim 1, wherein drying to constant weight is carried out at a temperature in the range of 40-100° C.

9. The method according to claim 1, wherein sodium oxalate, potassium oxalate, or ammonium oxalate is applied as water soluble salt of oxalic acid.

10. The method according to claim 1, wherein the concentration of oxalic acid is 25-300 g/l.

11. The method according to claim 1, wherein carbonizing is carried out in a furnace having a temperature of 350-800° C.

12. The method according to claim 11, wherein the terminal temperature of the furnace is achieved by raising the temperature at a rate of 0.1-0.6° C./s, said terminal temperature being sustained for at least one hour.

13. The method according to claim 1, wherein the water-soluble peroxide compound is hydrogen peroxide.

14. The method according to claim 1, wherein the water-soluble peroxide compound is sodium peroxysulphate or ammonium peroxysulphate.

15. The method according to claim 1, wherein the concentration of the peroxide compound is 5-50%.

16. The method according to claim 1, wherein the conversion of iron hydroxide to magnetite is carried out in an anaerobic manner in 1-6 hours, in a furnace having a temperature of 200-900° C.

17. The method according to claim 1, wherein
drying to constant weight is carried out at a temperature of 79-90° C.;
the concentration of oxalic acid is 80-120 µl;
carbonizing is carried out in a furnace having a temperature of 400-500° C.;
the concentration of the peroxide compound is 7-15% and
the conversion of iron hydroxide to magnetite is carried out in an anaerobic manner in 2-4 hours in a furnace having a temperature of 400-800° C.

18. An apparatus for sorbent production, primarily for removing arsenic from drinking water, comprising a first saturation unit, a second saturation unit, a carbonization unit, a preoxidation unit, and a conversion unit, said units being interconnected for the transfer of materials therebetween, where
the first saturation unit has a first autoclave comprising a first support material inlet and a first solution inlet, with the first autoclave being connected to a first dryer via a first filter,
the second saturation unit has a second autoclave comprising a second support material inlet and a second solution inlet, with the second autoclave being connected to a second dryer via a second filter,
the carbonization unit has a first furnace comprising a third support material inlet,
the preoxidation unit has a third autoclave comprising a first activated carbon inlet and a third solution inlet, with the third autoclave being connected to a rinser via a third filter, and the rinser being connected to a third dryer via a fourth filter,
the conversion unit has a second furnace comprising a second activated carbon inlet, with a sorbent outlet being connected to the second furnace, and where
the first dryer of the first saturation unit is connected to the second autoclave of the second saturation unit through a second support material inlet,
the second dryer of the second saturation unit is connected to the first furnace of the carbonization unit through a third support material inlet,
the first furnace of the carbonization unit is connected to the third autoclave of the preoxidation unit through a first activated carbon inlet, and
the third dryer of the preoxidation unit is connected to the second furnace of the conversion unit through a second activated carbon inlet.

19. The apparatus according to claim 18, wherein a support material container is connected to the first autoclave through the first support material inlet, with a first solution tank being connected to the first autoclave through said first solution inlet.

20. The apparatus according to claim 18 or claim 19, wherein a ferric salt container is connected to the first solution tank.

21. The apparatus according to claim 18, wherein a ferric salt solution separated by the first filter is recycled into the first solution tank.

22. The apparatus according to claim 21, wherein an oxalic acid tank is connected to the second solution tank.

23. The apparatus according to claim 18, wherein the oxalic acid solution separated by the second filter is recycled into the second solution tank.

* * * * *